Figure 1:
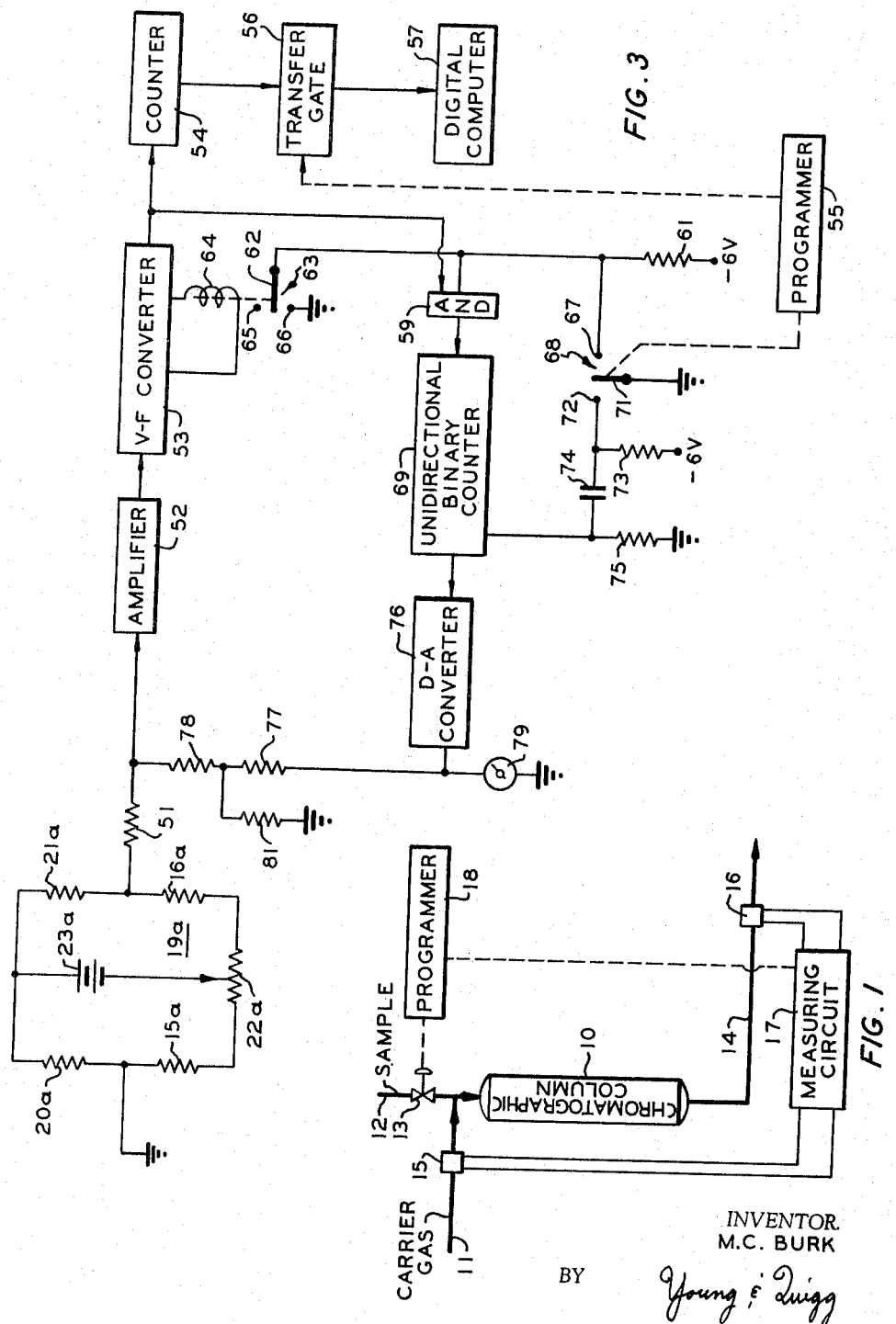

INVENTOR.
M.C. BURK

BY Young & Quigg

ATTORNEYS

United States Patent Office 3,316,751
Patented May 2, 1967

3,316,751
ELECTRICAL MEASURING APPARATUS
Marvin C. Burk, Bartlesville, Okla., assignor to Phillips Petroleum Company, a corporation of Delaware
Filed Dec. 9, 1963, Ser. No. 328,909
9 Claims. (Cl. 73—23.1)

This invention relates to electrical measuring apparatus. In one aspect the invention relates to apparatus for balancing an analog to digital converter. In another aspect the invention relates to apparatus for zeroing an electrical measuring system containing a bridge network and a voltage to frequency converter. In a further aspect the invention relates to an improved system for measuring a plurality of signals in sequence.

It is common practice in the electrical measuring art to utilize bridge networks which contain at least one impedance element that is representative of a condition to be measured. In chromatographic analyzers, for example, thermistors are usually disposed in the carrier gas supply and in the column effluent, respectively. A comparison of the temperatures sensed by these elements provides an indication of the appearance of constituents of the sample in the column effluent. This comparison of temperatures can readily be made by positioning the two thermistors in adjacent arms of an electrical bridge network. The resulting electrical unbalance of the network is thus indicative of the temperature difference between the two thermistors. Similar bridge networks are commonly employed in other types of analyzers, such as optical analyzers wherein radiation sensitive impedance elements compare the amounts of radiation in two beams. Frequently it is desired to convert the analog output of the bridge network to a digital signal to permit processing of the measured values in a digital computer. A suitable analog to digital converter which is often utilized in such systems is a voltage to frequency converter.

Electrical bridge networks of this type and the associated detecting circuits and analog to digital converters are often plagued by drift over periods of time. This can result from aging of circuit components, changes in power supplies, or from a number of other factors. In order to overcome this drift problem, various schemes have been designed to rebalance the bridge networks periodically. This is usually accomplished by means of a servo systems which employs a reversible motor to adjust an impedance in the bridge network. While these systems are satisfactory for many purposes, they are somewhat expensive to construct and require relatively long periods of time to rebalance the bridge network.

In accordance with the present invention there is provided a novel means for compensating for the drift of the analog to digital converter. The invention provides a system which can also be utilized to compensate for drift in the bridge network as well as to zero the analog to digital converter. Means are provided to measure the output of the analog to digital converter when no signal is being measured. This measured output represents the unbalance of the analog to digital converter or the unbalance of the combination of the bridge network and the analog to digital converter, depending upon the system utilized. The measured output, which is in digital form, is converted to analog form and a zeroing signal representative thereof is applied to a biasing terminal in the input to the analog to digital converter or in the bridge network, as desired. The zeroing signal then causes the output of the analog to digital converter to go to zero in the absence of a signal to be measured.

Accordingly it is an object of the invention to provide apparatus for zeroing analog to digital converters. Another object of the invention is to provide apparatus for rebalancing an electrical measuring system containing a bridge network and an analog to digital converter. Another object of the invention is to provide an improved apparatus for measuring a plurality of signals in sequence.

Other aspects, objects and advantages of the invention will become apparent to those skilled in the art from a study of the disclosure, the drawing and the appended claims to the invention.

Figure 2:
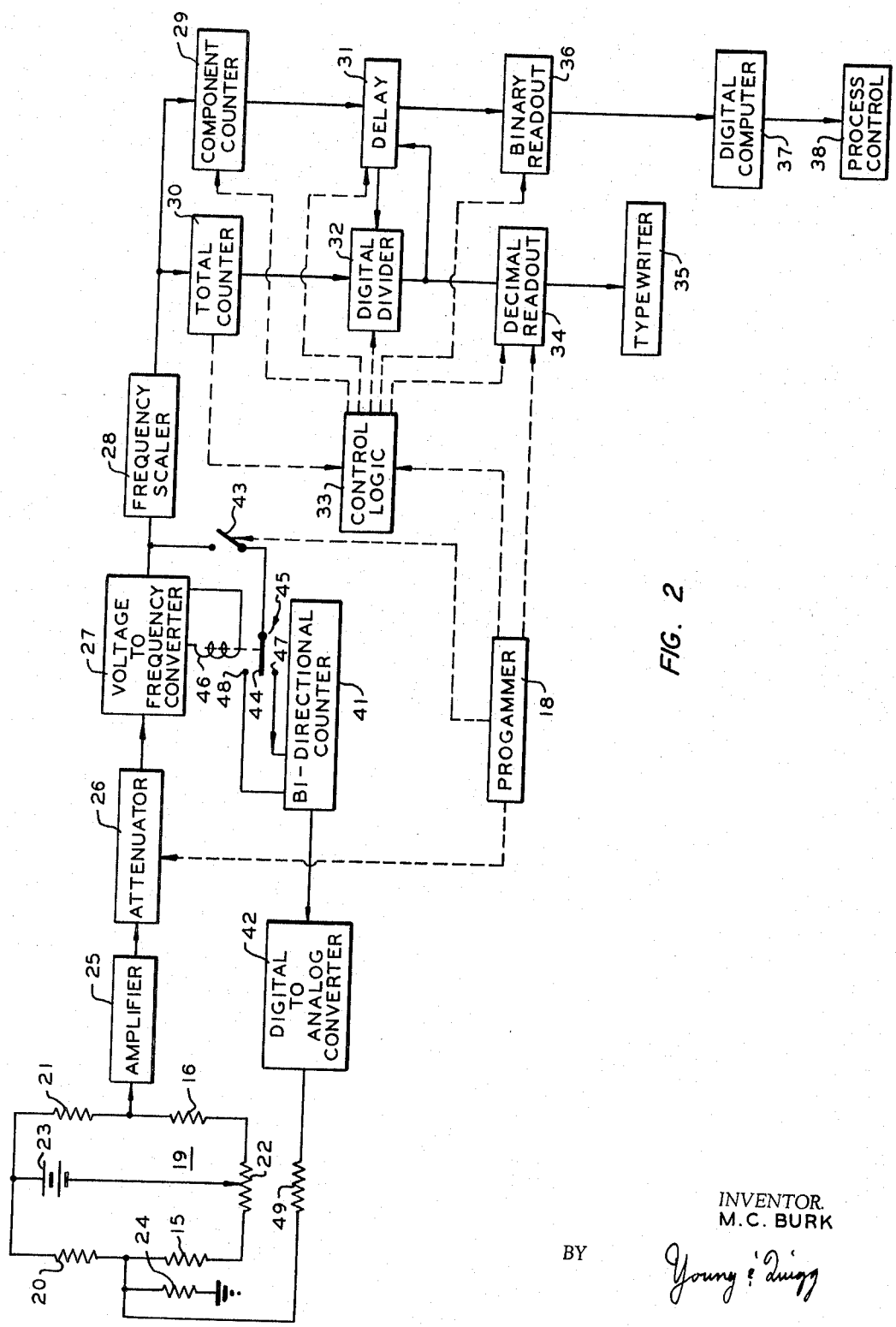

In the drawings FIGURE 1 is a schematic representation of a chromatographic analyzer system in which the present invention can be utilized, FIGURE 2 is a schematic representation of a measuring circuit incorporating one embodiment of the invention, and FIGURE 3 is a schematic representation of a measuring circuit incorporating a second embodiment of the invention.

Referring now to the drawing in detail and to FIGURE 1 in particular, a conventional chromatographic analyzer is illustrated. This analyzer comprises a column 10 which is filled with a packing material that selectively retards passage therethrough of the constituents of a fluid sample to be analyzed. A carrier gas is introduced into the inlet of column 10 from a conduit 11. A sample conduit 12, having a control valve 13 therein, communicates with conduit 11 near the inlet of column 10. Effluent is removed from column 10 through a conduit 14. First and second detectors 15 and 16, which advantageously are thermistors, are positioned in respective conduits 11 and 14. These two thermistors are connected into a detector circuit 17 which is described hereinafter in detail.

In normal operation of the analyzer of FIGURE 1, carrier gas initially flows through column 10 to purge any sample constituents that may remain from a previous analysis. Valve 13 is then opened momentarily by means of a programmer 18 to introduce a predetermined volume of sample into column 10. Although illustrated schematically, valve 13 can be any type of sample valve known in the chromatographic art for introducing preselected volumes of material. The carrier gas tends to force the components of the sample through column 10 at different rates which depend upon the affinity of the packing material for the individual components. Thus, the individual components of the sample appear in sequence in the column effluent. These components are measured by detector circuit 17.

Referring now to FIGURE 2 thermistors 15 and 16 constitute two arms of a bridge network 19. Resistors 20 and 21 are connected in series relationship between corresponding first terminals of thermistors 15 and 16. A potentiometer 22 is connected between the second terminals of thermistors 15 and 16. One terminal of a direct current voltage source 23 is connected to the junction between resistors 20 and 21. The second terminal of voltage source 23 is connected to the contactor of potentiometer 22. A resistor 24 is connected between ground and the junction between thermistor 15 and resistor 20. The junction between thermistor 16 and resistor 21 is connected to the input of an amplifier 25. The output of amplifier 25 is connected to the input of attenuating means 26, wherein each peak is attenuated by a respective attenuation factor as determined by programmer 18.

The bridge network is initially balanced when carrier gas is flowing past thermistors 15 and 16. This is accomplished by adjusting the contactor of potentiometer 22 until a zero or other predetermined reference signal is produced. When the temperature of themistor 16 subsequently changes, with respect to the temperature of themistor 15 due to the elution of a component peak the bridge becomes unbalanced and an output signal is produced. This is a conventional bridge detector circuit. Amplifier 25 increases the unbalance signal to a desired value.

A voltage to frequency converter 27 converts the output signal from attenuator 26 to a series of pulses with a frequency proportional to the amplitude of the input signal therto. A suitable converter for this purpose is the Model 240 converter, manufactured by Vidar, Inc., Mountain View, California. The number of pulses generated from the time the attenuated output signal leaves the base line until it returns to the base line represents the time integral of the component peak.

The output of converter 27 is applied to the input of a frequency scaler 28. Frequency scaler 28 comprises a plurality of frequency dividing circuits such that the frequencies of the output signals from the frequency dividing circuits are preselected fractions of the frequency F of the input signal. Thus, the frequencies of the output signals of the frequency dividing circuits can be, for example, F, F/2, F/4, F/8, etc. The output of frequency scaler 28 can be connected to the output of the frequency dividing circuit having the desired ratio. The output of frequency scaler 28 is connected to the inputs of component counter 29 and total counter 30. Total counter 30 counts all the pulses in the output signal of frequency scaler 28 as a measurement of the integral of all components combined. Component counter 29 counts the pulses in the output of frequency scaler 28 for a first interval corresponding to a first component as a measurement of the integral of said first component. The count corresponding to the first component is then transferred to delay 31 wherein it is stored. Component counter 29 is then reset for a second interval of operation corresponding to the second component. At the end of the second interval the count is transferred from component counter 29 to delay 31 wherein it is stored and component counter 29 is again reset for another interval of operation. This procedure is repeated until the integral of each of the components has been stored in delay 31. The output of total counter 30 is then transmitted to digital divider 32. The individual component integral signals are transmitted in sequence from delay 31 to digital divider 32 wherein they are normalized by dividing each component signal by the output signal from total counter 30. The operation of component counter 29, total counter 30, delay 31 and digital divider 32 can be controlled by control logic system 33, which in turn can be controlled by programmer 18.

The output of digital divider 32 is in serial pulse form with each pulse representing a certain percentage increment. The output of digital divider 32 is transmitted to the input of decimal readout system 34 wherein it is converted into a 10-line serial pulse output required by the control solenoids of typewriter 35. The 10-line serial pulse output of decimal readout 34 is transmitted along with appropriate control signals to typewriter 35. The operation of decimal readout system 34 can be controlled by signals from control logic 33 and programmer 18.

The normalized data can be returned to delay 31 for storage until needed. At a command from control logic 33, binary readout 36 can transfer the data to digital computer 37 in binary code. The output of computer 37 can be utilized in process control 38 to manipulate selected variables of a process.

As previously mentioned, it is desirable to rebalance the measuring system at predetermined intervals to compensate for any drift that may take place in the bridge network 19, amplifier 25 or voltage to frequency converter 27. This can be accomplished by means of counter 41 and digital to analog converter 42. The output of converter 27 is connected through switch 43 to the contactor 44 of switch 45. Switch 45 is actuated by relay 46 to connect contactor 44 to terminal 47 when the output of converter 27 is negative and to connect contactor 44 to terminal 48 when the output of converter 27 is positive. Terminals 47 and 48 are connected to the negative and positive inputs, respectively, of bi-directional counter 41 to thereby subtract or add, respectively, the error signal from the initial count registered by counter 41. The digital output of counter 41 is converted to an analog error voltage of digital to analog converter 42. The output of converter 42 is applied through resistor 49 to the junction between thermistor 15 and resistor 20. Resistors 49 and 24 thus form a dividing network to scale down the analog error signal to the desired voltage range. The resistor 24 is in series with the bridge circuit and thus affects the algebraic summation of the analog error signal and the drift error signal. Converter 42 is biased to produce a positive analog output when the count registered by counter 41 is less than a predetermined value and to produce a negative analog output when the count is greater than the predetermined value. The predetermined value is selected to permit suitable range on each side thereof and is advantageously the half full value.

When it is desired to rebalance the measuring network, a signal from programmer 18 is utilized to close switch 43 for a predetermined period of time. This can occur, for example, at the end of a complete analysis or between the appearances of the individual sample components in the column effluent. The position of contactor 44 of switch 45 is determined by the polarity indication relay 46 which is a part of converter 27. The output of converter 27 during such predetermined period of time is added or subtracted, according to polarity, from the count registered on counter 41 representative of the previously determined error signal. The output of counter 41 is continuously converted to an analog error signal by converter 42. The analog error signal is continuously applied to the biasing terminal of bridge 19 until the zeroing sequence is again initiated by programmer 18 and a new analog error signal is derived.

Referring now to FIGURE 3, the elements of bridge network 19a are identical to those of network 19 of FIGURE 2 and are identified by similar numbers followed by an a. The junction between thermistor 16a and resistor 21a is connected through resistor 51 to an input of amplifier 52. The amplified output signal is applied to an input of voltage to frequency converter 53. The digital output of converter 53 is applied to an input of counter 54. Programmer 55 actuates transfer gate 56 at the end of the counting of each component signal to transfer the output of counter 54 to digital computer 57.

The digital output of converter 53 is also applied to a first input of "and" circuit 59. A resistor 61 is connected between a source of negative voltage, for example —6 volts, and a second input of "and" circuit 59. Contactor 62 of switch 63 is connected to the second input of "and" circuit 59. Contactor 62 is actuated by polarity indication relay 64 to contact blank terminal 65 when the output of converter 53 is negative and to contact grounded terminal 66 when the output of converter 53 is positive. The second input of "and" circuit is also connected to terminal 67 of switch 68. The output of "and" circuit 59 is connected to the input of unidirectional binary counter 69. Contactor 71 of switch 68 is grounded and is actuated by programmer 55 between terminal 67 and terminal 72. Terminal 72 is connected to a source of negative potential, for example —6 volts, through resistor 73. The reset input of unidirectional binary counter 69 is connected to terminal 72 through capacitor 74 and to ground through resistor 75. The output of counter 69 is applied to the input of digital to analog converter 76. The analog output of converter 76 is applied through series connected resistors 77 and 78 to the input of amplifier 52. A voltmeter 79 can be connected between the output of converter 76 and ground. A resistor 81 is connected between ground and the junction between resistors 7 and 78. Resistors 51 and 78 form an algebraic summing network while resistors 77 and 81 reduce the analog error signal by a factor necessary to obtain the desired space at the input of amplifier 52.

As counter 69 is a unidirectional counter and can advance in only one direction, it must be reset at the start of the zeroing period so that the null is always approached from the same direction. Converter 76 is biased to produce a positive analog output when the count registered on counter 69 is less than a predetermined value and to produce a negative analog output when the counter is greater than the predetermined value. The predetermined value is selected to provide a suitable range on each side thereof and is advantageously the half full value. The bias value on converter 76 is selected to provide a positive input to amplifier 52 at all values of error to be compensated for by the zeroing network. Thus a bias value which provides a +5 millivolt analog error correction signal output at the input of amplifier 52 for a zero count registered by counter 69 would permit automatic rebalancing of drift error signals in the range of +5 millivolts to −5 millivolts.

When it is desired to rebalance the measuring circuit programmer 55 actuates contactor 71 to contact terminal 72, thereby resetting counter 69 and freeing the second input to "and" circuit 59 from ground by way of switch 68. In the absence of the elution of a component peak past the detecting thermistor the output of converter 53 is representative of the algebraic summation of any drift error signals and the +5 millivolt analog error correction signal from converter 76. If the drift error signal is in the range of +5 to −5 millivolts, the input of converter 53 will be negative due to the inversion action of amplifier 52. The negative input causes relay 64 to move contactor 62 to blank terminal 65, thereby freeing the second input of "and" circuit 59 from ground by way of switch 63. The ungrounding of the second input of "and" circuit 59 results in the application thereto of the negative signal across resistance 61, thereby actuating "and" circuit 59 to pass the output of converter 53 to counter 69. As the count on counter 69 builds up, the analog error correction signal from converter 76 is decreased. This continues until the analog error correction signal is equal to and of opposite polarity to the drift error signal, thereby causing the output of converter 53 to be zero. The zero output of converter 53 causes relay 64 to move contactor 62 to terminal 66, thereby grounding the second input of "and" circuit 59 and stopping the passing of the output of converter 53 to counter 69. At the end of the zeroing operation programmer 55 returns contactor 71 to terminal 67 to maintain the second input of "and" circuit 59 grounded until the next zeroing operation. The count stored on counter 69 is continuously converted to an analog error correction signal which is applied to the input of amplifier 52 to maintain the rebalanced condition. If the drift error signal goes outside of the +5 millivolt range, the measuring system is rebalanced by course zeroing potentiometer 22a.

Reasonable variation and modification are possible within the scope of the foregoing disclosure, the drawing and the appended claims to the invention.

I claim:

1. Apparatus for zeroing an analog to digital conversion system comprising a voltage source having a biasing terminal and an output terminal, an analog to digital converter, means for connecting said output terminal to an input of said analog to digital converter, means adapted to measure the digital output of said analog to digital converter, means for periodically connecting the input of said means to measure to the output of said analog to digital converter, means responsive to said means to measure to produce an analog error correction signal of a first polarity when the output of said means to measure is below a predetermined value and to produce an analog correction signal of opposite polarity when the output of said means to measure is above said predetermined value, and means for applying the analog error signal thus produced to said biasing terminal.

2. Apparatus in accordance with claim 1 wherein said voltage source comprises a bridge network.

3. Apparatus comprising a bridge network having first, second, third and fourth bridge terminals; a resistor connected between said first bridge terminal and ground; a direct current power supply connected between said second and fourth bridge terminals, said second and fourth bridge terminals being opposite terminals; a measuring element connected between two adjacent bridge terminals; an amplifier; means for connecting said third bridge terminal to an input of said amplifier; a voltage to frequency converter for producing responsive to each input signal a fluctuating output signal, each fluctuating output signal comprising a series of pulses having a frequency which is proportional to the amplitude of the respective input signal; means for connecting the output of said amplifier to the input of said voltage to frequency converter; said voltage to frequency converter having a polarity indicating relay; first switching means having first and second terminals and a contactor, said contactor being movable between said first and second terminals responsive to said polarity indicating relay; second switching means for periodically connecting the output of said voltage to frequency converter to said contactor; a bi-directional counter having a negative input terminal, a positive input terminal and an output; means for connecting said negative input terminal to said first terminal of said first switching means; means for connecting said positive input terminal to said second terminal of said first switching means; a digital to analog converter; means for connecting said output of said counter to the input of said digital to analog converter, said digital to analog converter being adapted to produce an analog output signal of a first polarity when the count registered by said counter is less than a predetermined value and to produce an analog output signal of the opposite polarity when the count registered on said counter is greater than said predetermined value; and a second resistor connected between the output of said digital to analog converter and said first bridge terminal.

4. Apparatus comprising a bridge network having first, second, third, and fourth bridge terminals; means for connecting said first bridge terminal to ground; a direct current power supply connected between said second and fourth bridge terminals, said second and fourth bridge terminals being opposite terminals; a measuring element connected between two adjacent bridge terminals; an amplifier; means for connecting said third bridge terminal to an input of said amplifier; a voltage to frequency converter for producing responsive to each input signal a fluctuating output signal, each fluctuating output signal comprising a series of pulses having a frequency which is proportional to the amplitude of the respective input signal; means for connecting the output of said amplifier to the input of said voltage of frequency converter; said voltage to frequency converter having a polarity indicating relay; first switching means having first and second terminals and a contactor, said contactor being movable between said first and second terminals responsive to said polarity indicating relay; a unidirectional digital counter having an input and an output; an "and" circuit; means for connecting the output of said voltage to frequency converter to a first input of said "and" circuit; means for connecting the output of said "and" circuit to said input of said counter; means for connecting said contactor of said first switching means to a second input of said "and" circuit; means for connecting said second terminal of said first switching means to ground; a source of reference potential; a resistor connected between said source of reference potential and said second input of said "and" circuit; second switching means comprising first and second terminals and a contactor; means for connecting said contactor of said second switching means to ground; means connecting said first terminal of said second switching means to said second input of said "and" circuit; means responsive to said contactor of said second switching means contacting said second terminal of said second switching means to reset said counter; means for moving said contactor of said second switching means to said second terminal of said second switching means when it is desired to zero said bridge network and said voltage to frequency converter and for moving said contactor of said second switching means to said first terminal of said second switching means at the conclusion of the zeroing operation; a digital to analog converter; means for connecting said output of said counter to the input of said digital to analog converter; and means for applying the output of said digital to analog converter to the said input of said amplifier.

5. Apparatus comprising a chromatographic column filled with a packing material that selectively retards passage therethrough of constituents of a fluid mixture to be analyzed, first conduit means for passing a carrier gas into the inlet of said column, a first sensing element positioned in said first conduit means for sensing a property of the carrier gas flowing therethrough, means for introducing a sample of fluid mixture to be analyzed into said first conduit means downstream of said first sensing element, second conduit means communicating with the outlet of said column, a second sensing element positioned in said second conduit means for sensing a property of the fluid flowing therethrough, a bridge network having first, second, third and fourth bridge terminals; a first resistor connected between said first bridge terminal and ground; a direct current power supply connected between said second and fourth bridge terminals, said second and fourth bridge terminals being opposite terminals; said first sensing element being connected between said first and second bridge terminals; said second sensing element being connected between said second and third bridge terminals; an amplifier; means for connecting said third bridge terminal to an input of said amplifier; a voltage to frequency converter for producing responsive to each input signal a fluctuating output signal, each fluctuating output signal comprising a series of pulses having a frequency which is proportional to the amplitude of the respective input signal; means for connecting the output of said amplifier to the input of said voltage to frequency converter; said voltage to frequency converter having a polarity indicating relay; first switching means having first and second terminals and a contactor, said contactor being movable between said first and second terminals responsive to said polarity indicating relay; second switching means for periodically connecting the output of said voltage to frequency converter to said contactor; a bi-directional counter having a negative input terminal, a positive input terminal and an output; means for connecting said negative input terminal to said first terminal of said first switching means; means for connecting said positive input terminal to said second terminal of said first switching means; a digital to analog converter; means for connecting said output of said counter to the input of said digital to analog converter, said digital to analog converter being adapted to produce an analog output signal of a first polarity when the count registered by said counter is less than a predetermined value and to produce an analog output signal of the opposite polarity when the count registered on said counter is greater than said predetermined value; and a second resistor connected between the output of said digital to analog converter and said first bridge terminal.

6. Apparatus comprising a chromatographic column filled with a packing material that selectively retards passage therethrough of constituents of a fluid mixture to be analyzed, first conduit means for passing a carrier gas into the inlet of said column, a first sensing element positioned in said first conduit means for sensing a property of the carrier gas flowing therethrough, means for introducing a sample of a fluid mixture to be analyzed into said first conduit means downstream of said first sensing element, second conduit means communicating with the outlet of said column, a second sensing element positioned in said second conduit means for sensing a property of the fluid flowing therethrough, a bridge network having first, second, third, and fourth bridge terminals; means for connecting said first bridge terminal to ground; a direct current power supply connected between said second and fourth bridge terminals, said second and fourth bridge terminals being opposite terminals; said first sensing element being connected between said first and second bridge terminals, said second sensing element being connected between said second and third bridge terminals; an amplifier; a first resistor connecting said third bridge terminal to an input of said amplifier; a voltage to frequency converter for producing responsive to each input signal a fluctuating output signal, each fluctuating output signal comprising a series of pulses having a frequency which is proportional to the amplitude of the respective output of said input signal; means for connecting the output of said amplifier to the input of said voltage to frequency converter, said voltage to frequency converter having a polarity indicating relay; first switching means having first and second terminals and a contactor, said contactor being actuated by said polarity indicating relay to contact said first terminal of said first switching means when the output of said voltage to frequency converter is negative and to contact said second terminal of said first switching means when the output of said voltage to frequency converter is positive; a unidirectional digital counter having a signal input and an output; an "and" circuit; means for connecting the output of said voltage to frequency converter to a first input of said "and" circuit; means for connecting the output of said "and" circuit to said signal input of said counter; means for connecting said contactor of said first switching means to a second input of said "and" circuit; means for connecting said second terminal of said first switching means to ground; a source of negative potential; a second resistor connected between said source of negative potential and said second input of said "and" circuit; second switching means comprising first and second terminals and a contactor; means for connecting said contactor of said second switching means to ground; means connecting said first terminal of said second switching means to said second input of said "and" circuit; means responsive to said contactor of said second switching means contacting said second terminal of said second switching means to reset said counter; means for moving said contactor of said second switching means to said second terminal of said second switching means when it is desired to zero said bridge network and said voltage to frequency converter and for moving said contactor of said second switching means to said first terminal of said second switching means at the conclusion of the zeroing operation; a digital to analog converter; means for connecting said output of said counter to the input of said digital to analog converter; and a third resistor for applying the output of said digital to analog converter to the input of said amplifier, said first and third resistors constituting a summing network; a second digital counter; and means for applying to said second digital counter the outputs of said voltage to frequency converter representative of the passage of components of said sample past said second sensing means.

7. Apparatus comprising a voltage source having a biasing terminal and an output terminal; an amplifier; means for connecting said output terminal to an input of said amplifier; a voltage to frequency converter for producing responsive to each input signal a fluctuating output signal, each fluctuating output signal comprising a series of pulses having a frequency which is proportional to the amplitude of the respective input signal; means for connecting the output of said amplifier to the input of said voltage to frequency converter; a bi-directional counter having a negative input terminal, a positive input terminal and an output; means for periodically connecting the output of said voltage to frequency converter to one of said negative input terminals and said positive input terminal, the connecting being made to said positive input terminal when the output of said voltage to frequency converter is of a first polarity and to said negative input terminal when the output of said voltage to frequency converter is of the opposite polarity; a digital to analog converter; means for connecting said output of said counter to the input of said digital to analog converter, said digital to analog converter being adapted to produce an analog error correction output signal of a first polarity when the count registered by said counter is less than a predetermined value and to produce an analog error correction output signal of the opposite polarity when the count registered on said counter is greater than said predetermined value; and means for applying the output of said digital to analog converter to said biasing terminal.

8. Apparatus comprising a voltage source having an output terminal; an amplifier; means for connecting said output terminal to an input of said amplifier; a voltage to frequency converter for producing responsive to each input signal a fluctuating output signal, each fluctuating output signal comprising a series of pulses having a frequency which is proportional to the amplitude of the respective input signal; means for connecting the output of said amplifier to the input of said voltage to frequency converter; a unidirectional digital counter having an input and an output; means adapted to transmit the output of said voltage to frequency converter to said input of said counter when said output of said voltage to frequency converter is of a first output; means for periodically resetting said counter and for simultaneously actuating said means to transmit; a digital to analog converter; means for connecting said output of said counter to the input of said digital to analog converter; and means for applying the output of said digital to analog converter to the input of said amplifier.

9. Apparatus for zeroing an electrical measuring system comprising a bridge network having a biasing terminal and an output terminal, a voltage to frequency converter, means for connecting said output terminal to an input of said voltage to frequency converter, digital counting means adapted to measure the digital output of said voltage to frequency converter, means for periodically connecting the input of said digital counting means to the output of said voltage to frequency converter, means responsive to said digital counting means to produce an analog error correction signal of a first polarity when the output of said digital counting means is below a predetermined value and to produce an analog correction signal of opposite polarity when the output of said digital counting means is above said predetermined value, and means for applying the analog error signal thus produced to said biasing terminal.

References Cited by the Examiner

UNITED STATES PATENTS

| | | | |
|---|---|---|---|
| 3,027,079 | 3/1962 | Fletcher et al. | 340—347 |
| 3,070,786 | 12/1962 | MacIntyre | 340—347 |
| 3,105,230 | 9/1963 | MacIntyre | 340—347 |

MAYNARD R. WILBUR, *Primary Examiner.*

K. STEVENS, W. J. KOPACZ, *Assistant Examiners.*